United States Patent
Fu et al.

(10) Patent No.: US 10,420,071 B2
(45) Date of Patent: *Sep. 17, 2019

(54) METHODS, APPARATUS, AND SYSTEMS FOR DISPLAYING NOTIFICATIONS

(71) Applicant: ALIBABA GROUP HOLDING LIMITED, George Town, Grand Cayman (KY)

(72) Inventors: Xiaozhen Fu, Hangzhou (CN); Jie Zhou, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/853,652

(22) Filed: Dec. 22, 2017

(65) Prior Publication Data

US 2018/0255530 A1 Sep. 6, 2018

Related U.S. Application Data

(63) Continuation of application No. 14/987,206, filed on Jan. 4, 2016, now Pat. No. 9,854,562.

(30) Foreign Application Priority Data

Jan. 6, 2015 (CN) .......................... 2015 1 0005903

(51) Int. Cl.
*H04M 1/00* (2006.01)
*H04W 68/04* (2009.01)
*H04W 4/12* (2009.01)

(52) U.S. Cl.
CPC ............. *H04W 68/04* (2013.01); *H04W 4/12* (2013.01)

(58) Field of Classification Search
CPC ....... H04W 4/12; H04W 4/14; H04W 88/184; H04L 12/5895; H04L 12/587; H04M 1/0214; H04M 1/72547; H04M 1/72519; H04M 1/72583; H04M 1/72522; H04M 3/537

(Continued)

(56) References Cited

U.S. PATENT DOCUMENTS 7,707,226 B1 4/2010 Tonse
8,792,912 B2 7/2014 Gits et al.
(Continued)

FOREIGN PATENT DOCUMENTS

CN 102484660 A 5/2012
WO WO-2016/111930 A1 7/2016

OTHER PUBLICATIONS

PCT International Search Report and Written Opinion dated Apr. 21, 2016, issued in corresponding International Application No. PCT/US16/12048 (13 pages).

(Continued)

*Primary Examiner* — Temica M Beamer
(74) *Attorney, Agent, or Firm* — Finnegan, Henderson, Farabow, Garrett & Dunner, LLP (57) ABSTRACT

A method for displaying prompting information includes receiving prompting information of a first message by a terminal device; confirming a current use state by the terminal device; and if the current use state is a preset first use state, displaying first prompting information of the first message on a screen by the terminal device, wherein the first prompting information is prompting information hiding or obscuring a specific content of the first message.

30 Claims, 5 Drawing Sheets

(58) Field of Classification Search
USPC ............... 455/466, 412.2, 566, 567, 458
See application file for complete search history.

(56) References Cited

U.S. PATENT DOCUMENTS

| | | |
|---|---|---|
| 2003/0208335 A1 | 11/2003 | Unuma et al. |
| 2010/0062804 A1 | 3/2010 | Yonemochi |
| 2010/0159904 A1 | 6/2010 | Colligan et al. |
| 2010/0222046 A1 | 9/2010 | Cumming |
| 2011/0177847 A1 | 7/2011 | Huang |
| 2013/0033523 A1 | 2/2013 | Stovicek et al. |
| 2013/0040662 A1 | 2/2013 | Elisco |
| 2013/0179107 A1 | 7/2013 | Setoguchi et al. |
| 2013/0222231 A1 | 8/2013 | Gärdenfors et al. |
| 2014/0085201 A1 | 3/2014 | Carmel-Veilleux et al. |
| 2014/0208333 A1 | 7/2014 | Beals et al. |
| 2014/0258870 A1 | 9/2014 | Gordon |
| 2014/0378099 A1 | 12/2014 | Huang et al. |
| 2016/0098076 A1 | 4/2016 | Chng et al. |

OTHER PUBLICATIONS

First Chinese Office Action issued in Chinese Application No. CN201510005903.3, dated Apr. 26, 2018, 12 pages.
First Chinese Search Report issued in Chinese Application No. CN201510005903.3, dated Apr. 8, 2018, 2 pages.

METHODS, APPARATUS, AND SYSTEMS FOR DISPLAYING NOTIFICATIONS

CROSS REFERENCE TO RELATED APPLICATION

This application is a continuation of Ser. No. 14/987,206 filed Jan. 4, 2016 which is based upon and claims priority to Chinese Application No. 201510005903.3, filed Jan. 6, 2015, both of which are incorporated herein by reference in their entirities.

TECHNICAL FIELD

The present application relates to communications among devices, and more particularly, to methods, apparatus, and systems for displaying notifications.

BACKGROUND

Mobile terminal devices such as smart phones and tablets have been used by many people for its convenience, but current notification display methods on such devices give rise to potential privacy issues. For example, an incoming message, when received by a cellphone, is usually displayed as a notification on a cellphone screen to the user and the notification usually indicates the sender's name and a first few phrases of the message. In a public environment, anyone who has a peek at the screen, whether purposely or accidentally, may notice the displayed information about the sender/message. For people who communicate exclusive or privileged information or who do not wish to share personal communications with other people, the current notification display methods cannot protect their privacy and may even invite safety issues such as identify theft.

SUMMARY

One aspect of the present disclosure is directed to a method for displaying prompting information. The method includes receiving prompting information of a first message by a terminal device; confirming a current use state by the terminal device; and if the current use state is a preset first use state, displaying first prompting information of the first message on a screen by the terminal device, wherein the first prompting information is prompting information hiding or obscuring a specific content of the first message.

Another aspect of the present disclosure is directed to an apparatus for displaying notifications. The apparatus includes a receiving unit configured to receive prompting information of a first message by a terminal device; a confirmation unit configured to confirm a current use state by the terminal device and if the current use state is a preset first use state, to display first prompting information of the first message on a screen by the terminal device, wherein the first prompting information is prompting information hiding or obscuring a specific content of the first message.

Another aspect of the present disclosure is directed to a non-transitory computer-readable storage medium embodying a computer program product, the computer program product comprising instructions configured to cause a computing device to perform a method. The method comprises receiving prompting information of a first message by a terminal device, confirming a current use state by the terminal device, and if the current use state is a preset first use state, displaying first prompting information of the first message on a screen by the terminal device, wherein the first prompting information is prompting information hiding or obscuring a specific content of the first message.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

The method and apparatus for displaying prompting information, according to an exemplary embodiment are suitable for various mobile terminal devices capable of receiving messages, e.g. mobile phones, tablet personal computers (PAD) and personal digital assistants (PDAs).

Figure 1:
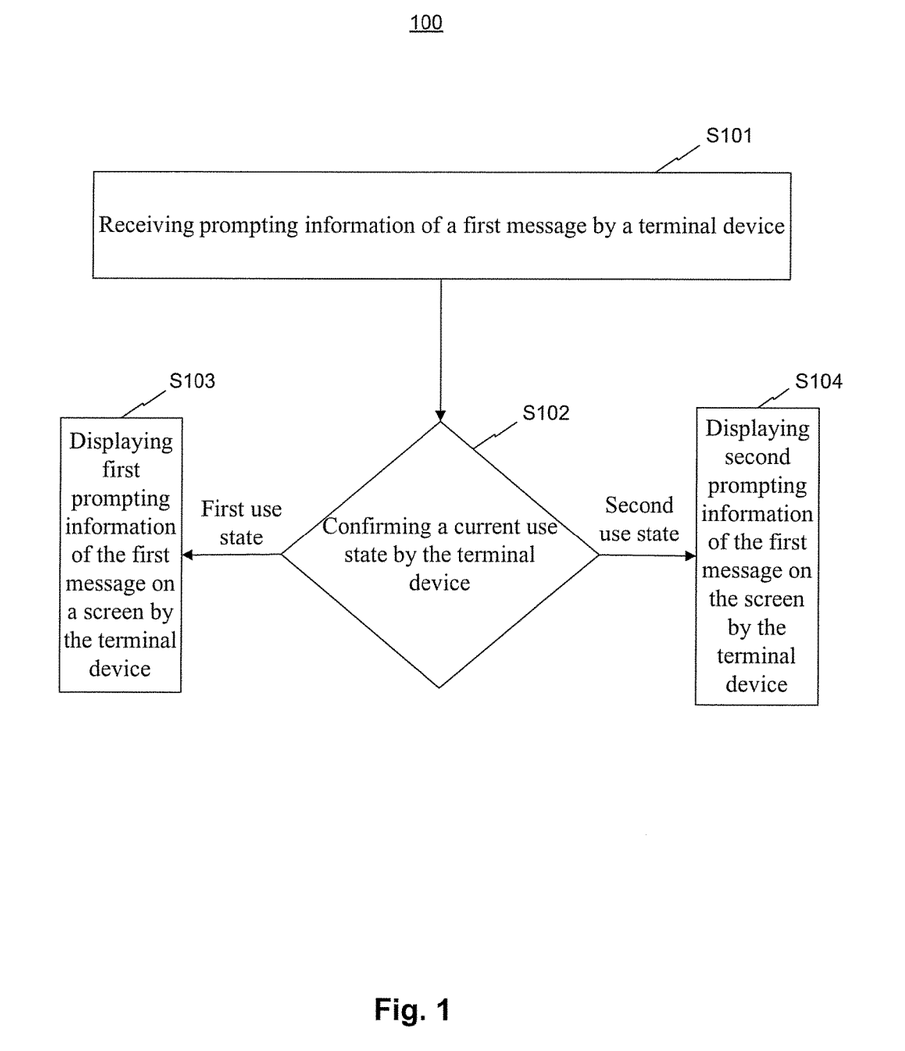
FIG. 1 is a flow diagram of a method for displaying prompting information, according to an exemplary embodiment.

FIG. 1 is a flow diagram of a method 100 for displaying prompting information, according to an exemplary embodiment. As shown in FIG. 1, the method for displaying prompting information according to an embodiment of the present application includes the following steps.

S101: receiving prompting information of a first message by a terminal device.

The prompting information of the first message comprises incoming call prompting information, short message prompting information, prompting information of an instant communication tool message, or prompting information of a push message of an application program. The short message prompting information is taken as an example in the embodiment of the present application.

S102: confirming a current use state by the terminal device. If the current use state is a preset first use state, proceed to S103; if the current use state is a preset second use state, proceed to S104.

The preset first use state may include that the terminal device being in a standby state, and the confirming a current use state by the terminal device comprises determining whether the terminal device is in a standby state.

In particular, for example, the terminal device may determine whether the screen is in a black or dark state, if yes, the terminal device is determined to be in a standby state; if not, the terminal device is determined to be in a non-standby state. Alternatively, the terminal device may also determine whether a time interval since the last time a user operating instruction is received exceeds a preset time interval. If yes, the terminal device is determined to be in a standby state; if not, the terminal device is determined to be in a non-standby state.

According to some other embodiments, the preset first use state may also be that the terminal device is in a non-moving standby state, and the confirming a current use state by the terminal device comprises determining whether the terminal device is in a moving state and determining whether the terminal device is in a standby state by the terminal device.

In particular, for example, the terminal device may sense moving state information of the terminal device via a moving sensor thereof. The moving state information may include one or any combination of velocity, acceleration or angular acceleration. The terminal device calculates moving state variance of the terminal device according to the moving state information, and then determines whether the moving state variance exceeds a preset threshold. If yes, the terminal device is determined to be in a moving state; if not, the terminal device is determined to be in a non-moving state.

The preset second use state may be that the terminal device is in a moving state, or the terminal device is in a non-standby state.

S103: displaying first prompting information of the first message on a screen by the terminal device.

The first prompting information is prompting information hiding or obscuring the specific content of the first message.

Figure 2A:
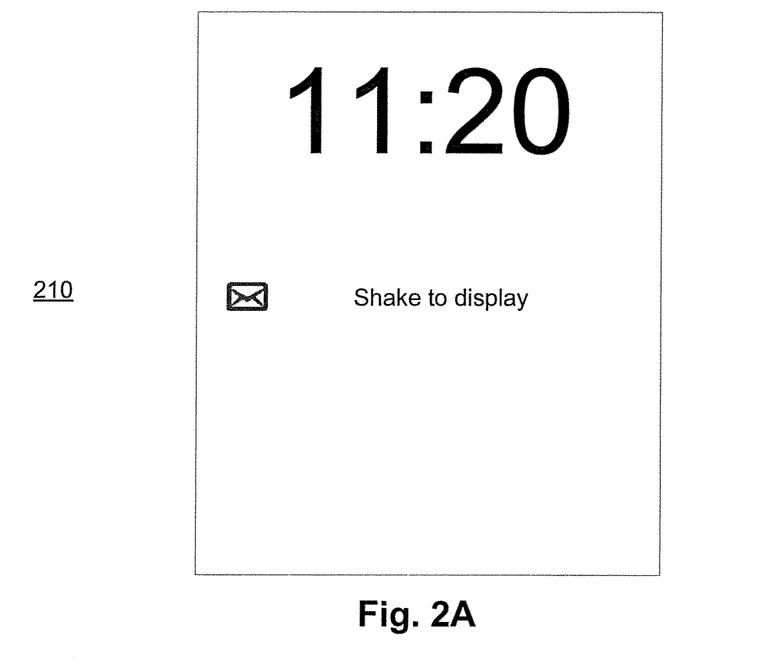
FIG. 2A is a graphical representation of first prompting information, according to an exemplary embodiment.

For example, as shown in FIG. 2A, when a mobile phone terminal device receives a piece of new information and confirms that the current state is a standby state, the terminal device displays a piece of prompting information that does not contain the specific content, e.g. "Shake to Display," as shown in box 210 The information also simultaneously prompts a user to change the moving state of the mobile phone terminal device by shaking the mobile phone terminal device. When the mobile phone terminal device is in a moving state, proceed to S104 to display prompting information containing the specific content.

S104: displaying second prompting information of the first message on the screen by the terminal device.

The second prompting information is prompting information containing the specific content of the first message.

The specific content of the first message displayed in the second prompting information may comprise the content of the first message and the information of a contact who sends the first message.

Figure 2B:
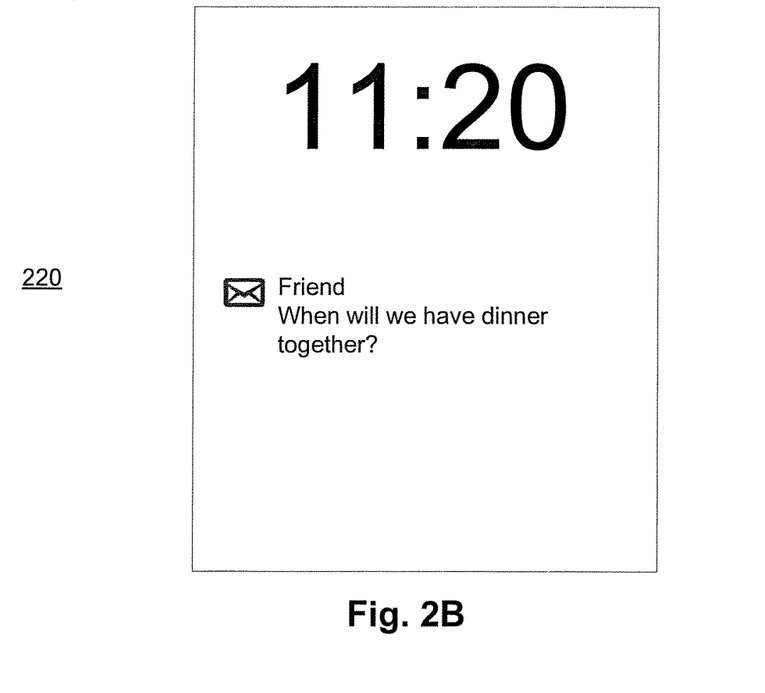
FIG. 2B is a graphical representation of second prompting information, according to an exemplary embodiment.

For example, as shown in FIG. 2B, when a mobile phone terminal device receives a piece of new information and confirms that the current state is a non-standby state or a moving state, the terminal device displays prompting information containing the specific content of the new message, e.g. the prompting information comprises the message content "When will we have dinner together?" and the contact "Friend" who sends the message, as shown in box 220.

Similarly, when a mobile phone terminal device receives a new incoming call and confirms that the current state is a standby state or a non-moving state, the terminal device may display first prompting information that only displays a new incoming call and does not display the specific contact information, but when a user shakes the mobile phone, the mobile phone terminal device is in a non-standby state or a moving state and then displays the specific contact information.

Figure 3:
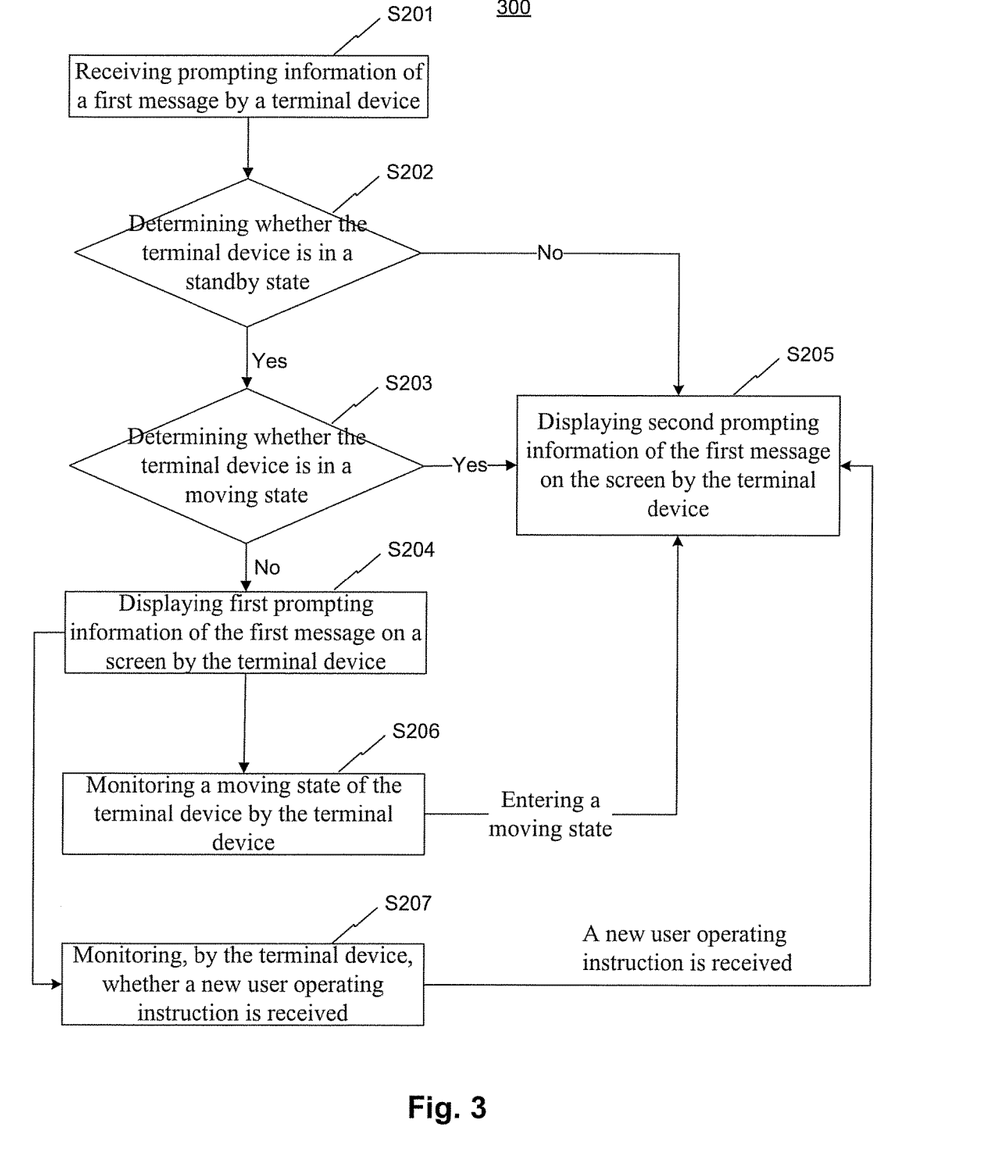
FIG. 3 is a flow diagram of another method for displaying prompting information, according to an exemplary embodiment.

FIG. 3 is flow diagram of another method 300 for displaying prompting information, according to an exemplary embodiment. As shown in FIG. 3, the method may include the following steps.

S201: receiving prompting information of a first message by a terminal device.

S202: determining whether the terminal device is in a standby state by the terminal device. If yes, proceed to S203, if not, proceed to S205.

S203: determining whether the terminal device is in a moving state by the terminal device. If yes, proceed to S205, if not, proceed to 5204.

S204: displaying first prompting information of the first message on a screen by the terminal device.

S205: displaying second prompting information of the first message on the screen by the terminal device.

The step S201 corresponds to S101 in FIG. 1, S202 and S203 are similar to S102, and S204-S205 are similar to S103-S104. The method further comprises after S204:

S206: detecting or monitoring a moving state of the terminal device by the terminal device, and when that the terminal device enters a moving state is detected, proceed to S205 to display prompting information containing the specific content of the first message.

For example, after the prompting information as shown in FIG. 2A is displayed in S204, the terminal device monitors moving state information of the terminal device via a moving sensor, and when that the terminal device enters a moving state is detected, e.g. when a user shakes the mobile phone, the terminal device displays clear prompting information on the screen, as shown in FIG. 2B.

S207: detecting or monitoring, by the terminal device, whether a new user operating instruction is received, if yes, proceed to S205 to display prompting information containing the specific content of the first message.

For example, after the prompting information as shown in FIG. 2A is displayed in S204, the terminal device detects whether a new operating instruction is received, and when a new operating instruction is received, e.g. when a user lights up the screen of the terminal device, the terminal device displays clear prompting information on the screen, as shown in FIG. 2B.

In the method for displaying prompting information, according to an exemplary embodiment, the display mode of prompting information is determined according to the use state of a terminal device, and the display of the specific content is hidden when a user does not use the terminal device, which, therefore, not only can prompt that there is new information, but also can effectively ensure that private information of the user is not leaked when there is new prompting information, thereby improving the safety of a terminal device. In addition, the moving state may be detected by a terminal device to determine whether a user picks up a mobile phone and automatically determine the use intention of the user, and then the specific content of a new message is displayed on a screen, so that the user can see corresponding information without the need to open an application, thereby improving the convenience in use of the terminal device.

The method for displaying prompting information, according to an exemplary embodiment has been described above in detail, and the apparatus for displaying prompting information provided by the present application will be described below in detail.

Figure 4:
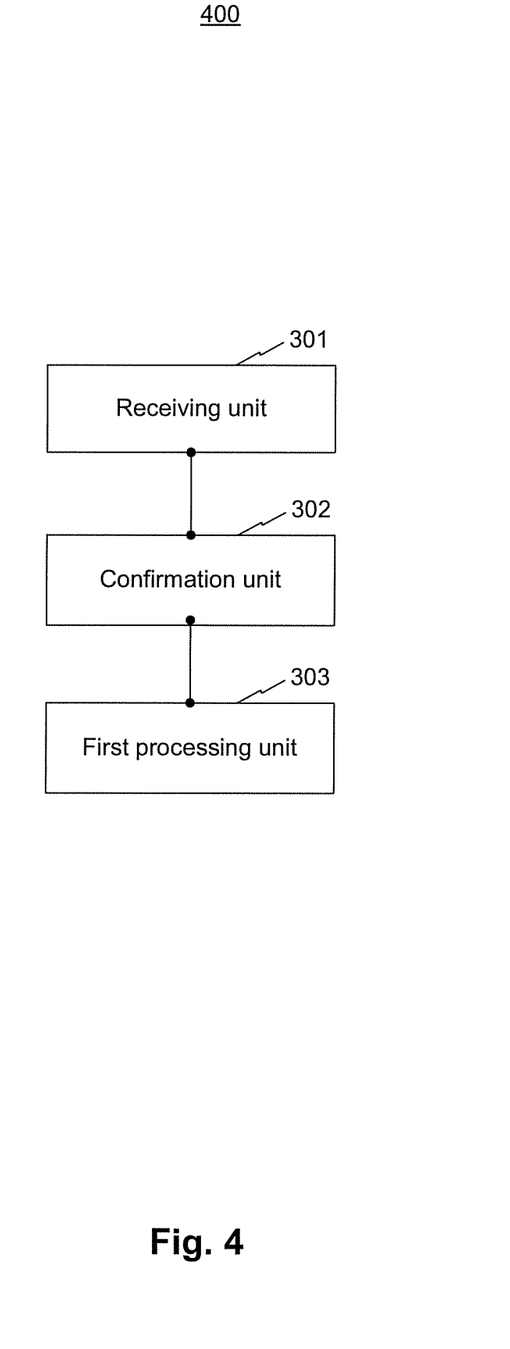
FIG. 4 is a block diagram of an apparatus for displaying prompting information, according to an exemplary embodiment.

FIG. 4 is a block diagram of an apparatus 400 for displaying prompting information, according to an exemplary embodiment. As shown in FIG. 4, the apparatus for displaying prompting information according to an embodiment of the present application comprises a receiving unit 301, a confirmation unit 302 and a first processing unit 303.

The receiving unit 301 receives prompting information of a first message.

The prompting information of the first message received by the receiving unit 301 may include incoming call prompting information, short message prompting information, prompting information of an instant communication tool message, or prompting information of a push message of an application program, or other suitable information.

The confirmation unit 302 confirms a current use state of a terminal device.

If the confirmation unit 302 confirms that the current use state is a preset first use state, the first processing unit 303 displays first prompting information of the first message on a screen. The first prompting information is prompting information hiding or obscuring the specific content of the first message.

The preset first use state may be that the terminal device is in a standby state, and the confirmation unit 302 determines whether the terminal device is in a standby state.

Alternatively, the preset first use state may be that the terminal device is in a non-moving standby state, and the confirmation unit 302 determines whether the terminal device is in a standby state and/or determines whether the terminal device is in a moving state.

The functions of the above units can correspond to the processing steps of the method as described in detail in FIG. 1, which will not be described in detail herein.

Figure 5:
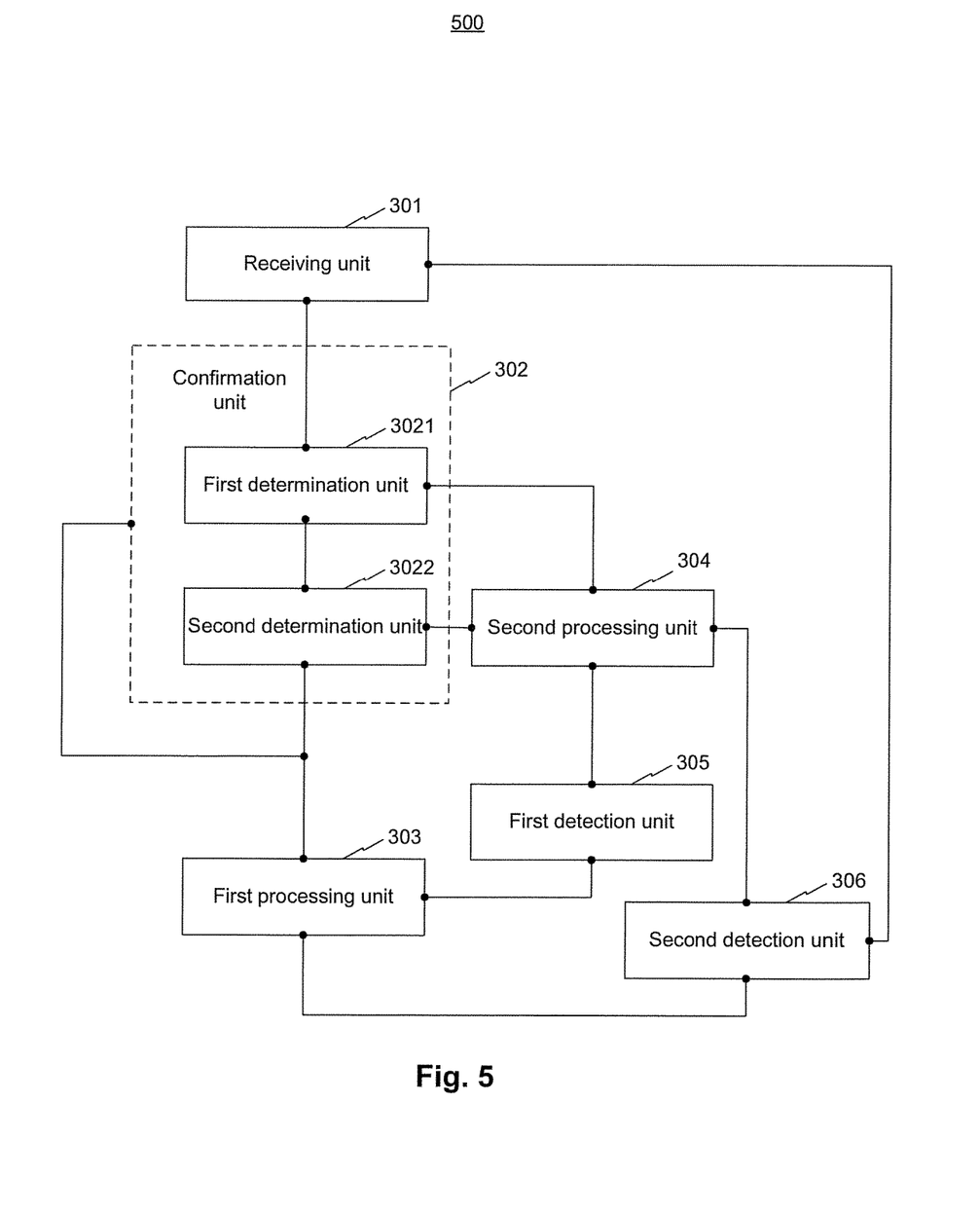
FIG. 5 is a block diagram of another apparatus for displaying prompting information, according to an exemplary embodiment.

FIG. 5 is a block diagram of another apparatus for displaying prompting information, according to an exemplary embodiment. As shown in FIG. 5, when compared with the device shown in FIG. 4, in addition to the receiving unit 301, the confirmation unit 302 and the first processing unit 303, the apparatus further comprises a second processing unit 304, a first detection unit 305 and a second detection unit 306.

The confirmation unit 302 comprises a first determination unit 3021 and a second determination unit 3022.

The first determination unit 3021 determines whether the terminal device is in a standby state. As an example, the first determination unit 3021 determines whether the screen is in a black or dark state, and if yes, the terminal device is determined to be in a standby state, if not, the terminal device is determined to be in a non-standby state. Alternatively, as another example, the first determination unit 3021 determines whether a time interval since the last time a user operating instruction is received exceeds a preset time interval, and if yes, the terminal device is determined to be in a standby state, if not, the terminal device is determined to be in a non-standby state.

The second determination unit 3022 determines whether the terminal device is in a moving state. In particular, for example, the second determination unit 3022 may comprise a moving sensor subunit, a calculation subunit and a first determination subunit. The moving sensor subunit senses or monitors the moving state of the terminal device and generates moving state information of the terminal device. The moving state information may comprise one or any combination of velocity, acceleration or angular acceleration. The calculation subunit calculates moving state variance of the terminal device according to the moving state information generated by the moving sensor subunit. The first determination subunit determines whether the moving state variance calculated by the calculation subunit exceeds a preset threshold, and if yes, the terminal device is determined to be in a moving state, if not, the terminal device is determined to be in a non-moving state.

If the confirmation unit 302 determines that the current use state is a preset second use state, the second processing unit 304 displays second prompting information of the first message on the screen. The second prompting information is prompting information containing the specific content of the first message.

The preset second use state may be that the terminal device is in a moving state, or the terminal device is in a non-standby state.

After the first processing unit 303 displays the first prompting information of the first message, the first detection unit 305 monitors a moving state of the terminal device, and when that the terminal device enters a moving state is detected, the terminal device displays the prompting information containing the specific content of the first message on the screen.

Also, after the first processing unit 303 displays the first prompting information of the first message, the second detection unit 306 may also monitors whether a new user operating instruction is received, and if yes, the terminal device displays the prompting information containing the specific content of the first message on the screen.

In the method and apparatus for displaying prompting information, according to an exemplary embodiment, the display mode of prompting information is determined according to the use state of a terminal device, and the display of the specific content is hidden when a user does not use the terminal device. That not only can prompt that there is new information, but also can effectively ensure that private information of the user is not leaked when there is new prompting information, thereby improving the safety of a terminal device. In addition, the moving state may be detected by a terminal device to determine whether a user picks up a mobile phone and automatically determine the use intention of the user, and then the specific content of a new message is displayed on a screen, so that the user can see corresponding information without the need to open an application, thereby improving the convenience in use of the terminal device.

The specification has described methods, apparatus, and systems for displaying notifications. The illustrated steps are set out to explain the exemplary embodiments shown, and it should be anticipated that ongoing technological development will change the mariner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable storage medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for displaying prompting information, comprising:
   receiving a message by a terminal device;
   determining whether the terminal device is in a standby state or a non-standby state;
   in response to a determination that the terminal device is in a standby state, determining whether the terminal device is in a moving state or a non-moving state; and
   in response to a determination that the terminal device is in a standby state and a moving state, displaying prompting information of the message on a screen of the terminal device, the prompting information including specific content of the message.

2. The method according to claim 1, wherein the prompting information of the message comprises at least one of incoming call prompting information, short message prompting information, prompting information of an instant communication tool message, or prompting information of a push message of an application program.

3. The method according to claim 1, wherein the determining whether the terminal device is in a standby state or a non-standby state comprises:
   determining whether the screen is in a black or dark state by the terminal device,
   in response to a determination that the screen is in a black or dark state, determining that the terminal device is in a standby state; and
   in response to a determination that the screen is not in a black or dark state, determining that the terminal device is in a non-standby state.

4. The method according to claim 1, wherein the determining whether the terminal device is in a standby state or a non-standby state comprises:
   determining, by the terminal device, whether a time interval since the last time a user operating instruction is received exceeds a preset time interval;
   in response to a determination that the time interval since the last time the user operating instruction is received exceeds the preset time interval, determining that the terminal device is in a standby state; and
   in response to a determination that the time interval since the last time the user operating instruction is received does not exceed the preset time interval, determining that the terminal device is in a non-standby state.

5. The method according to claim 1, wherein the determining whether the terminal device is in a moving state or a non-moving state comprises:
   sensing, by the terminal device, moving state of the terminal device via a moving sensor thereof and generating, by the moving sensor, moving state information, wherein the moving state information comprises one or any combination of velocity, acceleration or angular acceleration;
   calculating, by the terminal device, moving state variance of the terminal device according to the moving state information; and
   determining whether the moving state variance exceeds a preset threshold;
   in response to a determination that the moving state variance exceeds the preset threshold, determining that the terminal device is in a moving state; and
   in response to a determination that the moving state variance does not exceed the present threshold, determining that the terminal device is in a non-moving state.

6. The method according to claim 1, further comprising:
   in response to a determination that the terminal device is in a non-standby state, displaying the prompting information of the message on a screen by the terminal device.

7. The method according to claim 1, wherein the prompting information of the message is first prompting information,
   the method further comprising:
   in response to a determination that the terminal device is in a standby state and a non-moving state, displaying second prompting information of the message on the screen by the terminal device, wherein the second prompting information hides or obscures the specific content of the message.

8. The method according to claim 7, further comprising, after displaying the second prompting information of the message on the screen by the terminal device:
   monitoring a moving state of the terminal device; and
   in response to a detection that the terminal device enters a moving state, displaying the first prompting information containing the specific content of the message on the screen by the terminal device.

9. The method according to claim 7, further comprising, after displaying the second prompting information of the message on the screen by the terminal device:
monitoring whether a new user operating instruction is received; and
in response to a receipt of a new user operating instruction, displaying the first prompting information containing the specific content of the message on the screen by the terminal device.

10. The method according to claim 7, wherein the second prompting information contains information that prompts a user to change the moving state of the terminal device.

11. A terminal device for displaying notifications, comprising:
a receiving unit configured to receive a message;
a confirmation unit configured to:
determine whether the terminal device is in a standby state or a non-standby state;
in response to a determination that the terminal device is in a standby state, determine whether the terminal device is in a moving state or a non-moving state; and
in response to a determination that the terminal device is in a standby state and a moving state, display prompting information of the message on a screen of the terminal device, the prompting information including specific content of the message.

12. The terminal device according to claim 11, wherein the prompting information of the message comprises at least one of incoming call prompting information, short message prompting information, prompting information of an instant communication tool message, or prompting information of a push message of an application program.

13. The terminal device according to claim 11, wherein in determining whether the terminal device is in a standby state or a non-standby state, the confirmation unit is configured to:
determine whether the screen is in a black or dark state,
in response to a determination that the screen is in a black or dark state, determine that the terminal device is in a standby state; and
in response to a determination that the screen is not in a black or dark state, determine that the terminal device is in a non-standby state.

14. The terminal device according to claim 11, wherein in determining whether the terminal device is in a standby state or a non-standby state, the confirmation unit is configured to:
determine whether a time interval since the last time a user operating instruction is received exceeds a preset time interval;
in response to a determination that the time interval since the last time the user operating instruction is received exceeds the preset time interval, determine that the terminal device is in a standby state; and
in response to a determination that the time interval since the last time the user operating instruction is received does not exceed the preset time interval, determine that the terminal device is in a non-standby state.

15. The terminal device according to claim 11, wherein in determining whether the terminal device is in a moving state or a non-moving state, the confirmation unit is configured to:
sense moving state of the terminal device via a moving sensor thereof and generate moving state information, wherein the moving state information comprises one or any combination of velocity, acceleration or angular acceleration;
calculate moving state variance of the terminal device according to the moving state information; and
determine whether the moving state variance exceeds a preset threshold;
in response to a determination that the moving state variance exceeds the preset threshold, determine that the terminal device is in a moving state; and
in response to a determination that the moving state variance does not exceed the present threshold, determine that the terminal device is in a non-moving state.

16. The terminal device according to claim 11, wherein the confirmation unit is further configured to:
in response to a determination that the terminal device is in a non-standby state, display the prompting information of the message on a screen of the terminal device.

17. The terminal device according to claim 11, wherein the prompting information of the message is first prompting information,
the confirmation unit being further configured to:
in response to a determination that the terminal device is in a standby state and a non-moving state, display second prompting information of the message on the screen, wherein the second prompting information hides or obscures the specific content of the message.

18. The terminal device according to claim 17, wherein the confirmation unit is further configured to, after the displaying the second prompting information of the message on the screen:
monitor a moving state of the terminal device; and
in response to a detection that the terminal device enters a moving state, display the first prompting information containing the specific content of the message on the screen.

19. The terminal device according to claim 17, wherein the confirmation unit is further configured to, after the displaying the second prompting information of the message on the screen:
monitoring whether a new user operating instruction is received; and
in response to a receipt of a new user operating instruction, displaying the first prompting information containing the specific content of the message on the screen.

20. The terminal device according to claim 17, wherein the second prompting information contains information that prompts a user to change the moving state of the terminal device.

21. A non-transitory computer-readable storage medium storing a set of instructions that is executable by one or more processors of a terminal device to cause the terminal device to perform a method comprising:
receiving a message;
determining whether the terminal device is in a standby state or a non-standby state;
in response to a determination that the terminal device is in a standby state, determining whether the terminal device is in a moving state or a non-moving state; and
in response to a determination that the terminal device is in a standby state and a moving state, displaying prompting information of the message on a screen, the prompting information including specific content of the message.

22. The non-transitory computer-readable storage medium according to claim 21, wherein the prompting information of the message comprises at least one of incoming call prompting information, short message prompting information, prompting information of an instant communication tool message, or prompting information of a push message of an application program.

23. The non-transitory computer-readable storage medium according to claim 21, wherein the determining whether the terminal device is in a standby state or a non-standby state comprises:
- determining whether the screen is in a black or dark state,
- in response to a determination that the screen is in a black or dark state, determining that the terminal device is in a standby state; and
- in response to a determination that the screen is not in a black or dark state, determining that the terminal device is in a non-standby state.

24. The non-transitory computer-readable storage medium according to claim 21, wherein the determining whether the terminal device is in a standby state or a non-standby state comprises:
- determining whether a time interval since the last time a user operating instruction is received exceeds a preset time interval;
- in response to a determination that the time interval since the last time the user operating instruction is received exceeds the preset time interval, determining that the terminal device is in a standby state; and
- in response to a determination that the time interval since the last time the user operating instruction is received does not exceed the preset time interval, determining that the terminal device is in a non-standby state.

25. The non-transitory computer-readable storage medium according to claim 21, wherein the determining whether the terminal device is in a moving state or a non-moving state comprises:
- sensing moving state of the terminal device via a moving sensor thereof and generating, by the moving sensor, moving state information, wherein the moving state information comprises one or any combination of velocity, acceleration or angular acceleration;
- calculating moving state variance of the terminal device according to the moving state information; and
- determining whether the moving state variance exceeds a preset threshold;
- in response to a determination that the moving state variance exceeds the preset threshold, determining that the terminal device is in a moving state; and
- in response to a determination that the moving state variance does not exceed the present threshold, determining that the terminal device is in a non-moving state.

26. The non-transitory computer-readable storage medium according to claim 21, wherein the set of instructions that is executable by the one or more processors of the terminal device causes the terminal device to further perform:
- in response to a determination that the terminal device is in a non-standby state, displaying the prompting information of the message on the screen.

27. The non-transitory computer-readable storage medium according to claim 21, wherein the prompting information of the message is first prompting information, and
- wherein the set of instructions that is executable by the one or more processors of the terminal device causes the terminal device to further perform:
  - in response to a determination that the terminal device is in a standby state and a non-moving state, displaying second prompting information of the message on the screen, wherein the second prompting information hides or obscures the specific content of the message.

28. The non-transitory computer-readable storage medium according to claim 27, wherein the set of instructions that is executable by the one or more processors of the terminal device causes the terminal device to further perform, after displaying the second prompting information of the message on the screen:
- monitoring a moving state of the terminal device; and
- in response to a detection that the terminal device enters a moving state, displaying the first prompting information containing the specific content of the message on the screen.

29. The non-transitory computer-readable storage medium according to claim 27, wherein the set of instructions that is executable by the one or more processors of the terminal device causes the terminal device to further perform, after displaying the second prompting information of the message on the screen:
- monitoring whether a new user operating instruction is received; and
- in response to a receipt of a new user operating instruction, displaying the first prompting information containing the specific content of the message on the screen.

30. The non-transitory computer-readable storage medium according to claim 27, wherein the second prompting information contains information that prompts a user to change the moving state of the terminal device.

* * * * *